United States Patent
Brooks et al.

[15] 3,682,010
[45] Aug. 8, 1972

[54] PULLEY CONSTRUCTION

[72] Inventors: Joseph F. Brooks; Harold W. Schaefer, both of Bloomington, Ill.

[73] Assignee: National Union Electric Corporation, Stamford, Conn.

[22] Filed: April 29, 1970

[21] Appl. No.: 32,844

[52] U.S. Cl. ............................................. 74/230.01
[51] Int. Cl. ............................................ F16h 55/36
[58] Field of Search ...... 15/389; 74/230.01; 74/230.3

[56] References Cited

UNITED STATES PATENTS 468,843  2/1892  St. John ................... 74/230.01

*Primary Examiner*—Leonard H. Gerin
*Attorney*—Hibben, Noyes & Bicknell

[57] ABSTRACT

A pulley for use in a belt drive assembly. The outer surface of the pulley is divided into high friction portions which are in frictional engagement with the belt and low friction portions where the belt has little or no driving engagement with the pulley. The effective or belt-engaging areas of the high and low friction portions are proportioned to obtain a driving relationship with the belt under normal load conditions but to slip under overload conditions.

12 Claims, 13 Drawing Figures

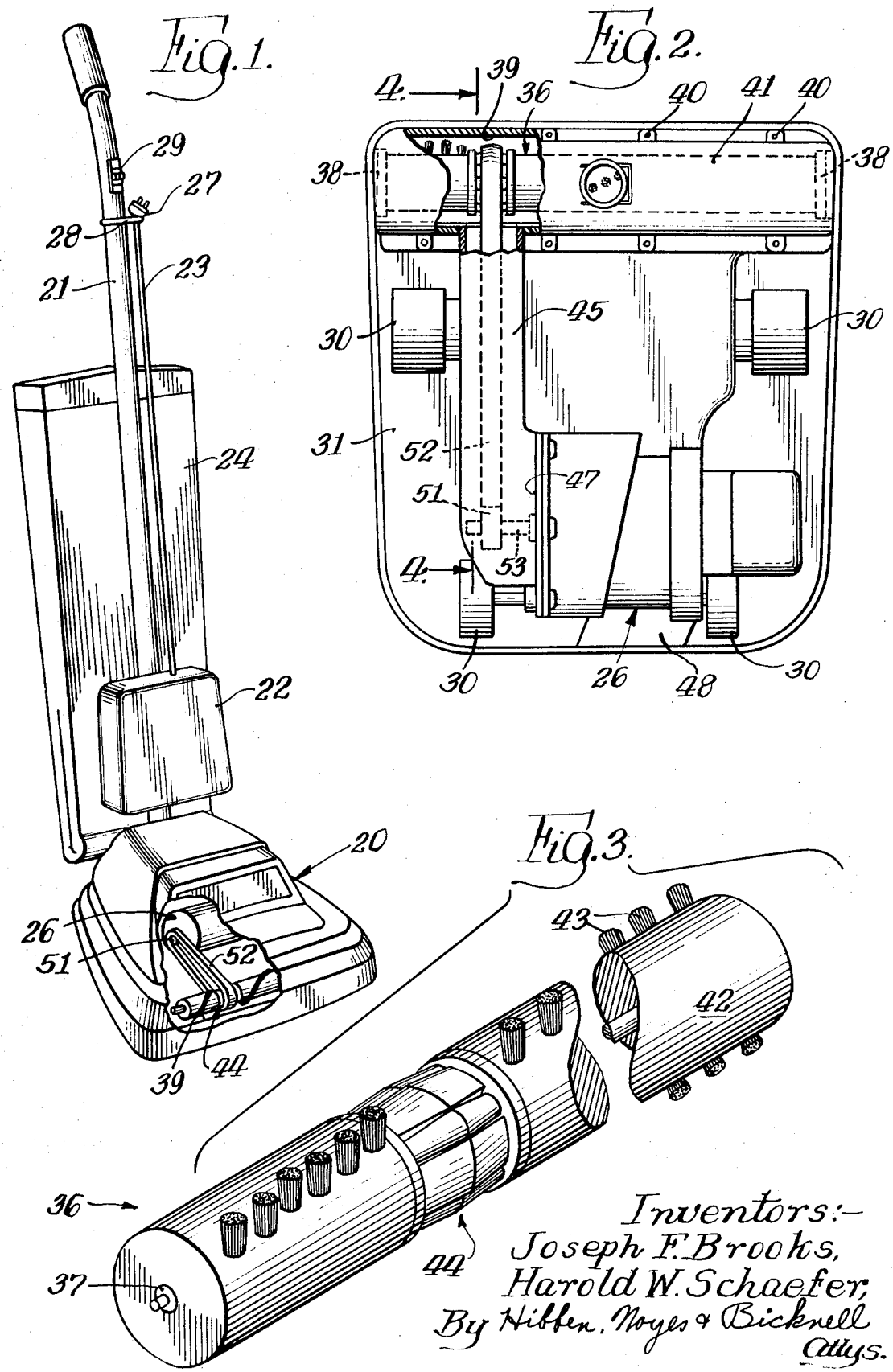

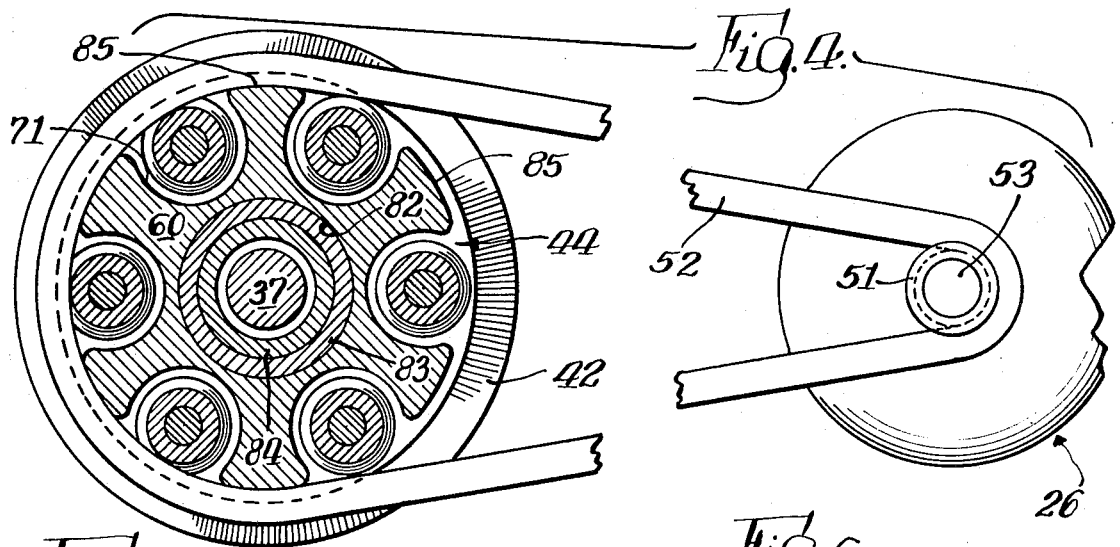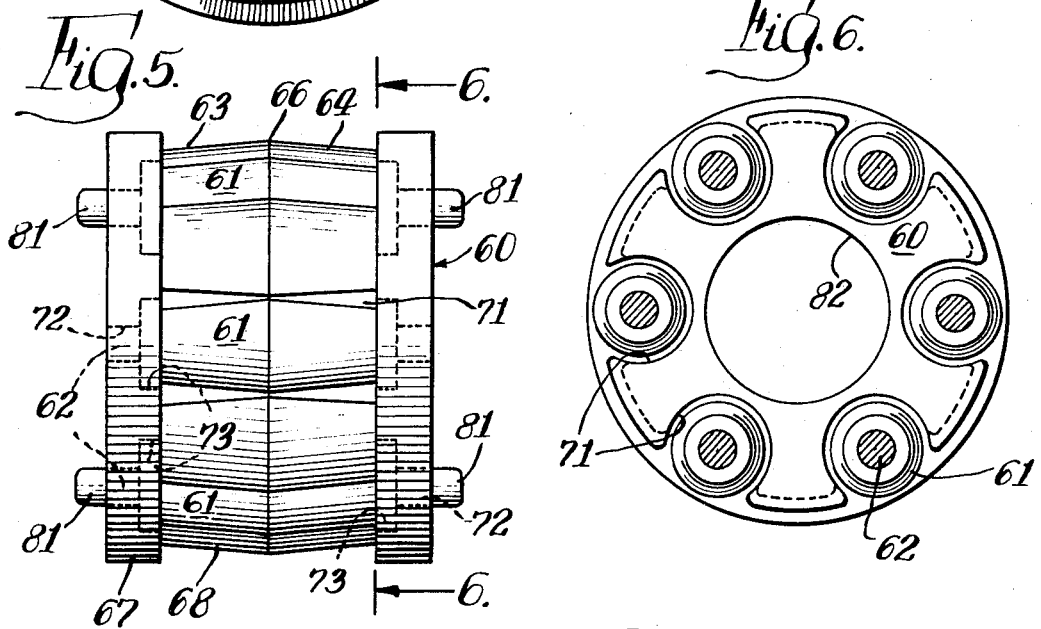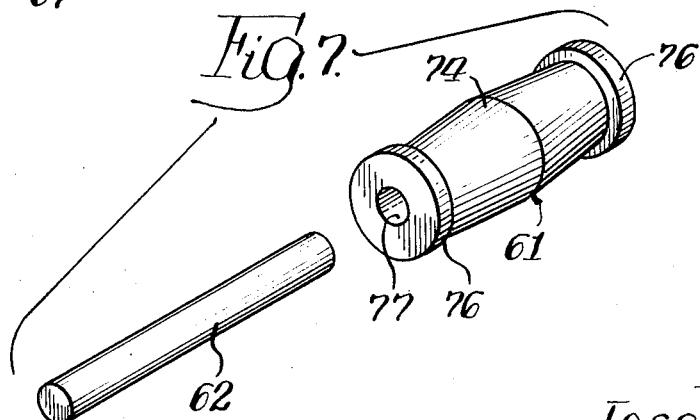

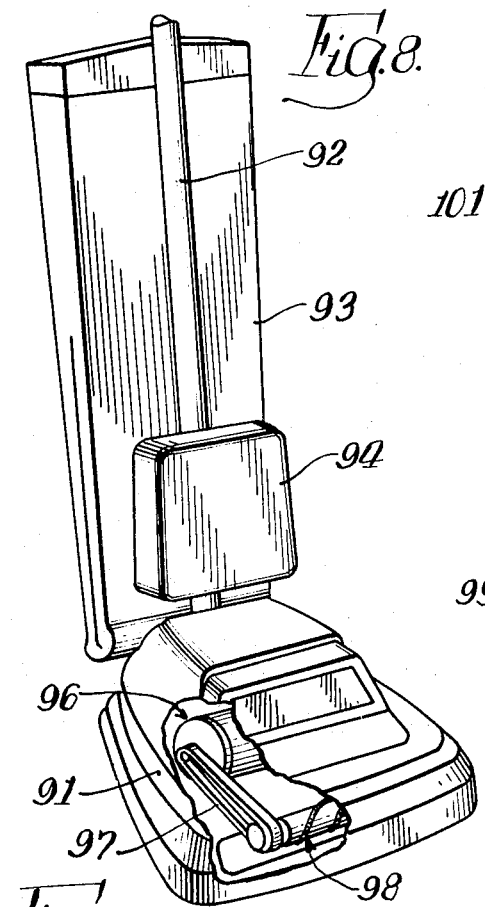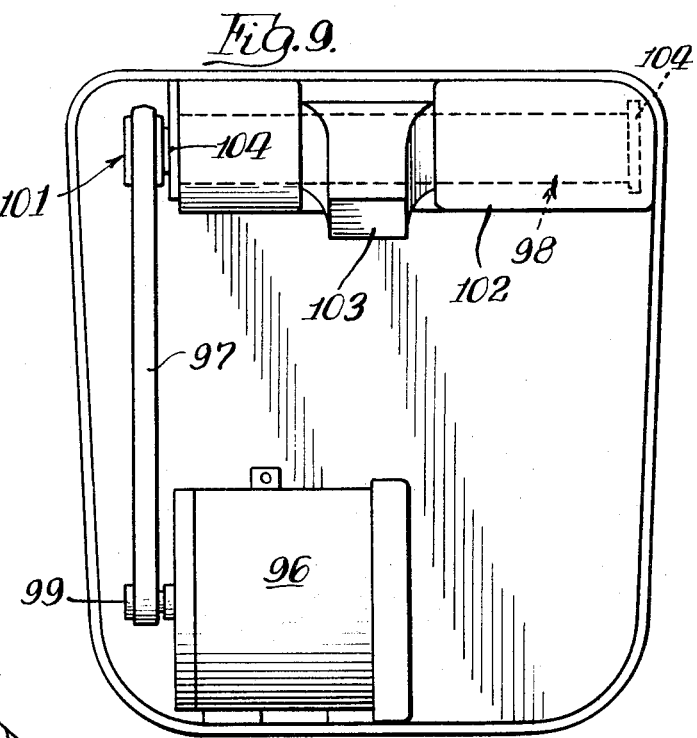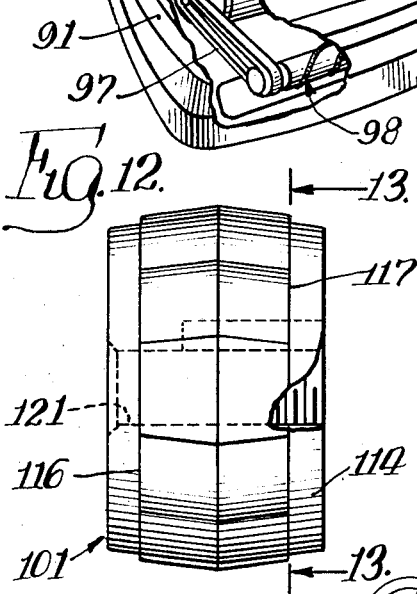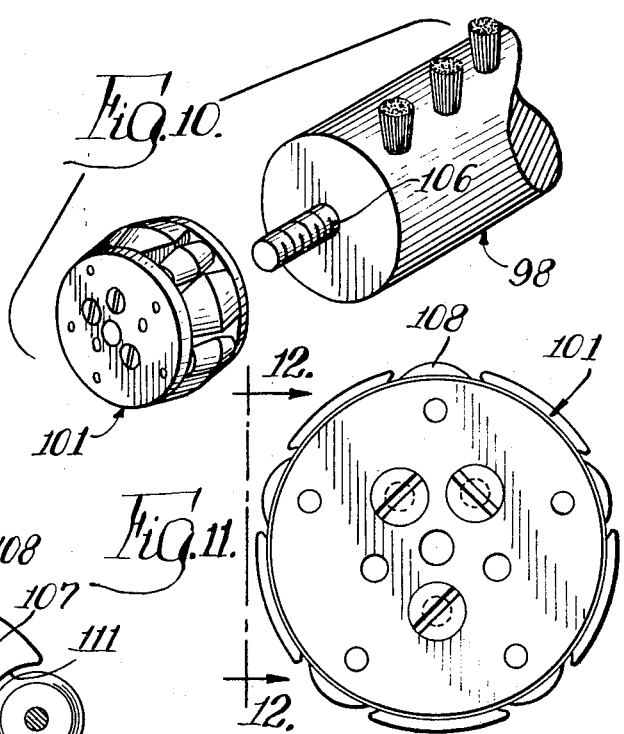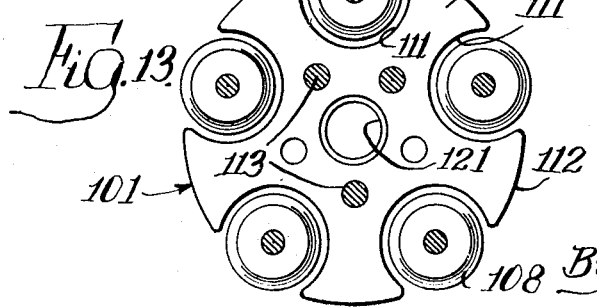

PULLEY CONSTRUCTION

Belt drives are of course well known and commonly used to rotatably couple a drive motor to a device to be driven. Such an arrangement includes a drive pulley connected to the power output shaft of the drive motor, a driven pulley connected to the driven device, and a belt coupling the two pulleys. The diameters of the drive and driven pulleys are proportioned to produced a desired speed ratio.

In such an arrangement, a problem arises where the driven device is subject to being heavily overloaded or jammed, resulting in the driven pulley either slowing down or stopping entirely. Where the driven pulley has a larger diameter than the drive pulley to obtain a speed reduction, it has been found that the belt may be damaged or destroyed by the drive pulley in such circumstances. This is due to the fact that the area of contact between the belt and the driven pulley is large as compared with the area of contact between the belt and the drive pulley, resulting in the belt having greater frictional engagement with the driven pulley than with the drive pulley. Consequently, when the driven pulley is stopped, it holds the belt against turning while the drive pulley continues to turn. The rapidly turning drive pulley rubs against the belt and may quickly generate enough heat to damage the belt by melting it. Use of an ordinary friction clutch has proven to be unsatisfactory because they usually wear or burn out when used frequently over a long period of time.

In accordance with the present invention the foregoing problem is eliminated by providing a clutch pulley having its outer belt contact surface divided into high friction portions and low friction portions. The total area of the high friction portions is proportioned relative to the total area of the low friction portions to obtain sufficient tractive effort or force to drive the driven device under normal load conditions but to enable the belt to slip on the pulley under overload conditions. The diameter of the belt contact surface of the clutch pulley is sized to provide a desired speed ratio.

Objects and advantages of the invention will become apparent from the following detailed description taken in conjunction with the accompanying figures of the drawings, wherein:

FIG. 1 is a perspective view of a vacuum cleaner including a clutch pulley embodying the invention;

FIG. 2 is an enlarged view of the vacuum cleaner with the hood thereof removed to show internal parts;

FIG. 3 is an enlarged perspective view showing a rotating brush assembly of the vacuum cleaner;

FIG. 4 is an enlarged fragmentary sectional view taken on the line 4—4 of FIG. 2;

FIG. 5 is an enlarged view showing a clutch pulley embodying the invention;

FIG. 6 is a sectional view taken on the line 6—6 of FIG. 5;

FIG. 7 is an exploded view showing parts of the clutch pulley;

FIG. 8 is a view generally similar to FIG. 1 but illustrating a cleaner including a clutch pulley in accordance with an alternate form of the invention;

FIG. 9 is a view generally similar to FIG. 2 but showing the cleaner of FIG. 8;

FIG. 10 is a fragmentary enlarged exploded view showing the alternate form of pulley;

FIG. 11 is another view showing the alternate form of the pulley;

FIG. 12 is a view taken on the line 12—12 of FIG. 11; and

FIG. 13 is a sectional view taken on the line 13—13 of FIG. 12.

While the clutch pulley is described herein in connection with a drive for a rotating brush of a vacuum or suction cleaner, it should be understood that it also has wide use in other fields. Further, although the clutch pulley described herein is used as a driven pulley, it should be understood that it also has use as a drive pulley.

With reference to the drawings, FIGS. 1 and 2 illustrate a suction or vacuum cleaner of the upright type, including a hood 20 covering internal parts of the machine, a handle 21 for moving the cleaner across the floor, a cord reel holder 22 attached to the handle for storing a length of electric cord 23, and a filter bag support 24 also attached to the handle. One end of the electric cord 23 extends into the interior of the hood 20 and is connected to a motor-fan unit 26. The other end of the electric cord 23 has a conventional plug 27 attached thereto for connecting the motor-fan unit 26 to an electric outlet. A clip or cord holder 28 may be attached to the handle 21 for holding the plug 27 when the cleaner is not in use, and an on-off switch 29 may be mounted on the upper end of the handle 21 for the convenience of the operator in turning the motor-fan unit 26 on and off. Wheels 30 (FIG. 2) are provided for moving the cleaner across the floor during operation.

With reference to FIG. 2, the cleaner further includes a frame 31, the motor-fan unit 26 and the wheels 30 being fastened to the frame. Rotatably mounted on the frame is a rotating brush assembly 36, shown in greater detail in FIG. 3. The brush assembly 36 includes a shaft 37 which is supported at its ends by brackets 38 (FIG. 2) adjacent the forward side of the frame 31. The shaft 37 extends down the center of and rotatably supports a cylindrical roll 42, and bristles 43 are secured to and extend outwardly from the outer surface of the roll 42. A clutch pulley 44, to be described in greater detail hereinafter, is secured to the roll 42 intermediate its ends. An arcuate cover or housing 41 is positioned over the brush assembly 36 and fastened to the frame 31 by screws 40, as shown in FIG. 2. The frame 31 has an elongated opening 39 (FIGS. 1 and 2) formed therein below the brush assembly 36, and the bristles 43 extend into the opening 39 when the assembly 36 is rotated during operation of the cleaner. A duct or dirt passage 45 connects the interior of the housing 41 to an air intake 47 of the motor-fan unit 26, the unit 26 further including an outlet 48 which is connected to a filter bag located in the bag support 24.

In addition to driving a fan, the motor of the unit 26 is also connected to drive the brush assembly 36 during operation of the cleaner. The drive connection includes a drive pulley 51, the clutch pulley 44, and a belt 52 (FIGS. 1, 2 and 4). The drive pulley 51 is secured to the drive shaft 53 of the motor in the unit 26, and the belt 52 extends through the dirt passage 45. The drive motor normally rotates at much higher speed than it is desirable for the brush assembly to rotate, and consequently the diameter of the drive pulley 51 is made smaller than the diameter of the clutch pulley 44, as shown in FIG. 4, in order to effect a speed reduction.

During operation of the cleaner, the motor-fan unit 26 is energized by connecting the plug 27 in an electrical outlet and turning on the switch 29. The motor of the unit 26 drives the fan and also rotates the brush assembly 36. The fan creates a suction within the housing 41, such suction drawing dirt particles from a rug being cleaned upwardly through the opening 39, through the dirt passage 45, and out of the outlet 48 to the filter bag. The rotating brush assembly 36 serves to disturb and dislodge dirt particles so they can be drawn upwardly by the suction of the cleaner.

During such operation of the cleaner, it frequently happens that the brush assembly 36 may be slowed down or stopped entirely due to a loose article on the floor being caught by the bristles 43, or by a rug having a relatively long nap being caught in the bristles 43. If the brush assembly 36 included an ordinary driven pulley construction, such an event would result in the belt 52 being held stationary by the driven pulley while the drive pulley 51 continued to turn at a relatively high speed. Consequently, in a cleaner having a conventional pulley arrangement, it frequently happens that the belt is destroyed by the heat of friction generated by the drive pulley rubbing against the belt.

Such destruction of the belt is avoided when using the clutch pulley 44. The pulley 44 comprises a main body 60 which is generally circular in cross section, (FIGS. 4 to 6), a plurality of rollers 61 and a plurality of pins 62. The main body 60 includes a pair of identical sections 63 and 64 which, when assembled, are in butting relation along the line indicated by the numeral 66 in FIG. 5. Each of the sections 63 and 64 includes a side wall 67 and a tapered portion 68, the wall 67 having a larger diameter than the portion 68, and the taper of the portion 68 being radially outwardly and away from the wall 67. Due to the tapers of the portions 68, the main body 60 has a crowned configuration between the two side walls 67, as shown in FIG. 5. This crowned configuration is used with a flat belt having a width less than the distance between the two walls 67, the crown serving to maintain the belt at substantially the center of the pulley as shown in FIG. 2.

With particular reference to FIGS. 4 and 6, the two sections 63 and 64 have a plurality of arcuate cavities 71 formed therein, the cavities 71 opening to the outer surfaces of the sections. Longitudinally extending holes 72 are formed through the two end walls 67 in alignment with the center of each cavity 71, and each of the holes 72 is counterbored, as indicated at 73, at its inner end.

With reference to FIG. 7, each of the rollers 61 has a crowned central portion, indicated at 74, and two end walls 76. The crowned portion 74 has essentially the same configuration and length as the crowned portion of the main body 60 as shown in FIG. 5, and the end walls 76 are sized to fit entirely within the counterbores 73. One of the pins 62 is positioned through an axial hole 77 formed through each roller 61, the pins being sufficiently long to extend into the holes 72 in the walls 67, thus rotatably supporting a roller 61 in each cavity 71.

The clutch pulley assembly may be fastened to the remainder of the brush assembly 36 by any suitable means. In the present instance, the roll 42 is formed in two segments and the clutch pulley is located between the two segments. The clutch pulley is fastened to the two segments by making some or all of the pins 62 sufficiently long that they extend beyond the outer surfaces of the two sections 63 and 64. With reference to FIG. 5, the extended portions of two of the pins 62 are indicated by the reference numeral 81. Holes, located in alignment with the extensions 81, are formed in the adjoining surfaces of the two segments of the roll 42, the holes in the segments receiving the extensions 81 and thus preventing the clutch assembly from turning relative to the roll 42.

To maintain the clutch pulley 44 centered in the brush assembly, a central hole 82 (FIGS. 4 and 6) is formed through the main body 60 and the segments of the roll 42 including telescoping tubular portions 83 and 84 (FIG. 4) which extend around the shaft 37 and into the hole 82 in snug-fit relation therewith.

As best shown in FIG. 4, the belt 52 engages the outer surfaces of the portions 85 of the main body 60, between the cavities 71, and the outer surfaces of the rollers 61. Tractive effort or torque is exerted by the belt 52 on the portions 85, and these portions are referred to herein as "high friction" portions of the clutch pulley. Since the rollers 61 are freely rotatable on the main body 60, little or no tractive effort is exerted on them by the belt 52, and the area represented by the outer surfaces of the rollers is referred to herein as "low friction" portions of the clutch pulley. The outer surface areas of the high friction portions 85 are proportioned, relative to the outer surface areas of the low friction portions, to produce sufficient torque to turn the brush assembly during operation of the cleaner. However, in the event the brush assembly is jammed, the low friction portions comprising the rollers 61 enable the belt to turn relative to the main body 60, thereby preventing the drive pulley 51 from burning out the belt 52. In the construction illustrated, the high friction portions 85 comprise approximately one-half the total belt engaging surface of the pulley. As previously mentioned, the contour of the rollers 61 is substantially the same as that of the portions 85 of the main body 60, and such construction is desirable because it reduces flexing of the belt as the belt passes over the rollers and the portions 85. While the clutch pulley might be operative without the rollers 61, their presence is desirable because they provide surface continuity between adjacent high friction portions 85 and thus reduce flexing of the belt. The rollers also reduce the pressure per unit area by the belt on the portions 85 and thus enable the belt to slide on the portions 85. While the belt will slide on the portions 85 when the brush assembly is jammed and generate some heat, the relatively large pulley 44 forms an excellent heat sink and thus prevents damage to the belt 52.

The clutch pulley need not, of course, be fastened to a driven device intermediate the ends thereof as shown in FIGS. 1 to 7. FIGS. 8 through 13 illustrate a construction including a generally similar clutch pulley, wherein the pulley is fastened to an end of a brush assembly of a cleaner. The cleaner shown in FIGS. 8 and 9 is generally similar to that shown in FIGS. 1 and 2, and includes a hood 91, a handle 92, a filter bag holder 93 and a cord reel holder 94. The cleaner further includes a motor-fan unit 96, a belt 97, and a brush assembly 98. A drive pulley 99 attached to the unit 96 drives the belt 97, and a clutch pulley 101 is fastened to one end of the brush assembly 98. A cover 102 is positioned over the brush assembly 98 and includes an outlet 103 which is connected by a duct (not shown) to a filter bag in the holder 93. The brush assembly 98 is rotatably supported on the frame of the cleaner by brackets 104 (FIG. 9), and a centrally located shaft 106 of the brush assembly 98 supports the brush assembly on the brackets 104.

As shown in FIG. 10, one end of the shaft 106 is threaded and the clutch pulley 101 is screwed on this end. The clutch pulley 101 includes a main body 107, a plurality of rollers 108, and a plurality of pins 109 which support the rollers 108 on the body 107. Formed in the main body 107 are a plurality of equally spaced arcuate cavities 111 which are similar to the cavities 71. The outer surface portions 112 between the cavities 111 are referred to herein as high friction portions. The rollers 108 are supported by the pins 109 in the cavities 111 and are referred to herein as low friction portions of the clutch pulley. The rollers 108 and the main body 107 have similar contours. The pulley 101 is also designed for use with a flat belt and therefore both the rollers 108 and the portions 112 have crowned configurations. As shown in FIG. 12, neither the main body 107 nor the rollers 108 includes radially extending side walls corresponding to the walls 67 and 76 of the pulley 44.

To facilitate manufacture of the main body 107 and assembly with the pins 109 and rollers 108, the main body 107 is comprised of two parts which are fastened together by screws 113 (FIG. 13). One part of the main body 107 is indicated by a reference numeral 116 and comprises the remainder of the main body 107, the two parts 114 and 116 abutting along the line indicated by the reference numeral 117 in FIG. 12. Internally threaded and countersunk holes are formed in the segments 114 and 116 for the screws 113. To fasten the clutch pulley 101 to the shaft 106, an axially located, internally threaded hole 121 is formed through the clutch pulley 101, which is screwed on the threaded end of the shaft 106.

The operation and advantages of the pulley illustrated in FIGS. 8 through 13 are similar to the pulley illustrated in FIGS. 1 through 7, the differences between the two constructions being the location of the pulley on the brush assembly and the manner in which the pulleys are connected to the brush assembly, and the fact that the clutch pulley illustrated in FIGS. 8 through 13 does not include side walls.

While the clutch pulleys illustrated and described herein are designed for use with a flat belt, it will be apparent that clutch pulleys embodying the invention may be designed for use with round belts or V-belts. When used with a round or a V-belt, the portions of the pulley which are engaged by the belt are curved or dished inwardly to match the shape of the belt, rather than crowned as illustrated in the drawings. In any construction, the relative areas of the high and low friction portions of the the clutch pulley are proportioned to provide sufficient tractive effort to turn the device being driven while at the same time enabling the belt to slip on the pulley in the event the device being driven is stopped for any reason. The amount of tractive effort exerted by the belt on the clutch pulley is determined by the relative areas of the high and low friction portions, their radial dimensions, the tension on the belt, and the circumferential spacing between adjacent low friction portions and adjacent high friction portions. As previously mentioned, a clutch pulley as described herein is not limited in its use to a suction cleaner but may be used in numerous other fields. While a clutch pulley embodying the invention may be used as a drive pulley rather than as a driven pulley, it is preferably used as a driven pulley because it can be made relatively large to obtain a speed reduction and, at the same time, it can be constructed to slip during overload conditions. While the clutch pulley has been described as being advantageous in situations where flexibility in the amount of torque delivered is desirable, it may also be used where shock reduction is desired.

We Claim:

1. A clutch pulley for use in a drive assembly including a belt and a cooperating pulley, said clutch pulley comprising a generally circular main body including a plurality of relatively high friction means on the outer surface thereof, said high friction means being circumferentially spaced around the periphery of said main body and being adapted to be engaged by said belt, and a plurality of members rotatably mounted on said main body and adapted to be engaged by said belt, one of said members being located in each of the spaces between said spaced high friction means.

2. A clutch pulley as in claim 1, wherein said high friction means comprises circumferentially spaced outer surface portions of said main body.

3. A clutch pulley as in claim 1, wherein a plurality of cavities are formed in said main body between said high friction means, said members being mounted in said cavities.

4. A clutch pulley as in claim 1, wherein each of said members comprises a roller rotatable mounted on said main body.

5. A clutch pulley as in claim 4, wherein said rollers and said high friction means have generally similar outer contours.

6. A clutch pulley as in claim 5, wherein said rollers and said high friction means have crowned contours.

7. A clutch pulley as in claim 1, wherein said high friction means comprises circumferentially spaced outer surface portions of said main body, and said outer surface portions are separated by cavities formed in said main body, said members being mounted in said cavities.

8. A clutch pulley for use in a drive assembly including a belt and a cooperating pulley, said clutch pulley comprising a generally circular main body, high friction means on the outer periphery of said body, said high friction means including a plurality of circumferentially spaced portions, and low friction means on the outer surface of said main body, said low friction means including a plurality of members rotatably mounted in the spaces between said circumferentially spaced portions, said high and said low friction means having similar outer contours and both being adapted to be engaged by said belt.

9. A clutch pulley as in claim 8, wherein the total area of said high friction means is proportioned relative to the total area of said low friction means to obtain sufficient tractive effort for the belt to drive said clutch pulley under normal load conditions but to enable said belt to slip under overload conditions.

10. A clutch pulley comprising a generally circular main body, a plurality of circumferentially spaced arcuate cavities formed in of said body, the axes of said cavities extending generally parallel to and being radially spaced from the axis of said main body, and a plurality of rollers, one of said rollers being rotatably mounted in each of said cavities, the outer surface portions of said body between said cavities forming high friction portions and said rollers forming low friction portions, and the outer contours of said outer surface portions and said rollers being generally similar.

11. A clutch pulley as in claim 10, wherein each of said rollers is rotatably supported on said body by a pin.

12. A clutch pulley as in claim 10 wherein said main body includes a pair of sections and means for securing said sections together, said sections being separable along a generally radially extending plane, one end of each of said rollers being supported by one of said sections and the other end of each of said rollers being supported by the other of said sections.

* * * * *